United States Patent [19]

Castelli et al.

[11] 4,286,706

[45] Sep. 1, 1981

[54] BELT TRACKING SYSTEM

[75] Inventors: Vittorio Castelli, Scarsdale; Ralph A. Hamaker, Penfield, both of N.Y.

[73] Assignee: Xerox Corporation, Stamford, Conn.

[21] Appl. No.: 50,271

[22] Filed: Jun. 19, 1979

[51] Int. Cl.³ .......... B65G 39/16

[52] U.S. Cl. .......... 198/806; 355/3 BE; 226/192; 474/102

[58] Field of Search .......... 74/240, 241; 198/806, 198/807, 840; 226/23, 192; 101/DIG. 13; 474/102, 123; 355/3 R, 3 BE

[56] References Cited

U.S. PATENT DOCUMENTS 3,315,859 4/1967 Owen et al. .......... 226/192

OTHER PUBLICATIONS

Research Disclosure, May 9, 1976, Morse et al., No. 14510, p. 29.

*Primary Examiner*—Joseph E. Valenza

*Attorney, Agent, or Firm*—H. M. Brownrout; H. Fleischer

[57] ABSTRACT

An apparatus in which the lateral movement of a belt arranged to move along a pre-determined path is controlled. The apparatus includes a belt sensor mounted translatably on a belt support. As the belt moves laterally, the sensor translates therewith causing the belt support to pivot so as to return the belt to the pre-determined path.

6 Claims, 3 Drawing Figures

1/2

BELT TRACKING SYSTEM

This invention relates generally to an electrophotographic printing machine, and more particularly concerns an improved apparatus for controlling the lateral movement of a moving photoconductive belt.

In an electrophotographic printing machine, a photoconductive belt is charged to a substantially uniform potential so as to sensitize the surface thereof. The charged portion of the photoconductive belt is exposed to a light image of an original document being reproduced. Exposure of the charged photoconductive belt selectively discharges the charge thereon in the irradiated areas. This records an electrostatic latent image on the photoconductive belt corresponding to the informational areas contained within the original document. After the electrostatic latent image is recorded on the photoconductive belt, the latent image is developed by bringing a developer mix into contact therewith. Generally, the developer mix comprises toner particles adhering triboelectrically to carrier granules. The toner particles are attracted from the carrier granules to the latent image forming a toner powder image on the photoconductive belt. The toner powder image is then transferred from the photoconductive belt to a copy sheet. Finally, the copy sheet is heated to permanently affix the toner particles thereto in image configuration. This general approach was originally disclosed by Carlson in U.S. Pat. No. 2,297,691, and has been further amplified and described by many related patents in the art.

Since the photoconductive belt passes through many processing stations during the printing operation, lateral alignment thereof is critical and must be controlled within prescribed tolerances. As the belt passes through each of these processing stations, the location of the latent image must be precisely defined in order to optimize the operations relative to one another. If the position of the latent image deviates from processing station to processing station, copy quality may be significantly degraded. Hence, lateral movement of the photoconductive belt must be minimized so that the belt moves in a pre-determined path.

Ideally, if the photoconductive belt were perfectly constructed and entrained about perfectly cylindrical rollers mounted and secured in an exactly parallel relationship with one another, the velocity vector of the belt would be substantially normal to the longitudinal axis of the roller and there would be no lateral walking or movement of the belt. However, in actual practice, this is not feasible. Frequently, the velocity vector of the belt approaches the longitudinal axis or axis of rotation of the roller at an angle. This produces lateral movement of the belt relative to the roller. Thus, the photoconductive belt must be tracked or controlled to regulate its lateral position. Hereinbefore lateral movement of a photoconductive belt has been controlled by crowned rollers, flanged rollers or servo systems. However, these types of devices frequently produce high local stresses resulting in damage to the highly sensitive photoconductive belt edges. Servo systems using steering rollers to maintain lateral control of the belt generally apply less stress to the side edges thereof. Frequently, servo systems of this type are rather complex and costly.

Various attempts have been made to provide guides and suitable constraints for flexible belts. The following art appears to disclose relevant devices which control the lateral alignment of a moving photoconductive belt:

U.S. Pat. No. 3,435,693
Patentee: Wright et al.
Issued: Apr. 1, 1969
U.S. Pat. No. 3,500,694
Patentee: Jones et al.
Issued: Mar. 17, 1970
U.S. Pat. No. 3,540,571
Patentee: Morse
Issued: Nov. 17, 1970
U.S. Pat. No. 3,698,540
Patentee: Jorden
Issued: Oct. 17, 1972
U.S. Pat. No. 3,702,131
Patentee: Stokes et al.
Issued: Nov. 7, 1972
U.S. Pat. No. 3,818,391
Patentee: Jorden et al.
Issued: June 18, 1974
Research Disclosure, May 9, 1976
Author: Morse et al.
No. 14510, page 29

The pertinent portions of the foregoing art may be briefly summarized as follows:

Wright et al. discloses a belt entrained about a plurality of spaced rollers. One end of the rollers are journaled in a pivotable frame. A sensing member is forced to the right by the laterally moving belt. The sensing member is connected by a linkage to the frame. If the belt is forced against the sensing member, the linkage rotates the frame to a position where the belt will track away from the sensing member until equilibrium is achieved.

Jones et al. describes a belt tracking system in which a sensing finger detects lateral movement of the belt and actuates a control motor. The control motor rotates a cam shaft which rotates a camming mechanism to pivot a steering roller so as to return the belt to the desired path of travel.

Morse discloses a belt tracking mechanism having a washer journeled loosely on the steering roller shaft. A pressure roller contacts the washer. The pressure roller is mounted on a pivotable rod and connected pivotably to a servo arm. The servo arm is connected pivotably to the frame. Horizontal motion of the belt causes the pressure roller to move horizontally, which, in turn, causes vertical motion of the servo arm causing the steering roller to pivot so as to restore the belt to the desired path.

Jorden, Stokes et al., and Jorden et al. all describe a belt steering apparatus employing a disc mounted loosely on one end of a belt support roller. The disc is connected to a linkage which pivots one of the other support rollers. Lateral movement of the belt causes the disc to translate pivoting the linkage, which, in turn, pivots the other support roller returning the belt to the pre-determined path of movement.

Morse et al. discloses a passive web tracking system. The web is supported in a closed loop path by a plurality of supports. The supports include a first roller. The first roller is pivotable to align its axis of rotation to the normal direction of travel of the web. Flanges, which are fixed, engage the side edges of the web preventing lateral movement thereof. A second roller, spaced from the first roller, is supported at its mid-point by a self-aligning radial ball bearing. A yoke supports the second roller pivotably. Movement of the roller is limited to rotation about a castering axis and a gimbal axis by a flexure arm. This permits the web to change direction providing uniform tension in the web span.

In accordance with the features of the present invention, there is provided an apparatus for controlling the lateral alignment of a belt arranged to move along a pre-determined path. The apparatus includes a tubular member arranged to support the portion of the belt passing thereover. A substantially stationarily mounted shaft member is disposed interiorly of and spaced from the tubular member. Means are provided for rotatably and pivotably mounting the tubular member on the shaft member. At least one sensing member is mounted translatably on the tubular member. The sensing member is positioned closely adjacent to a side edge of the belt so that lateral movement of the belt translates the sensing member in the lateral direction. Means, coupled to the sensing member, pivot the tubular member in response to translation of the sensing member so as to return the belt to the pre-determined path.

Other aspects of the invention will become apparent as the following description proceeds and upon reference to the drawings, in which.

While the present invention will hereinafter be described in connection with a preferred embodiment thereof, it will be understood that it is not intended to limit the invention to that embodiment. On the contrary, it is intended to cover all alternatives, modifications, and equivalents as may be included within the spirit and scope of the invention as defined by the appended claims.

Figure 1:
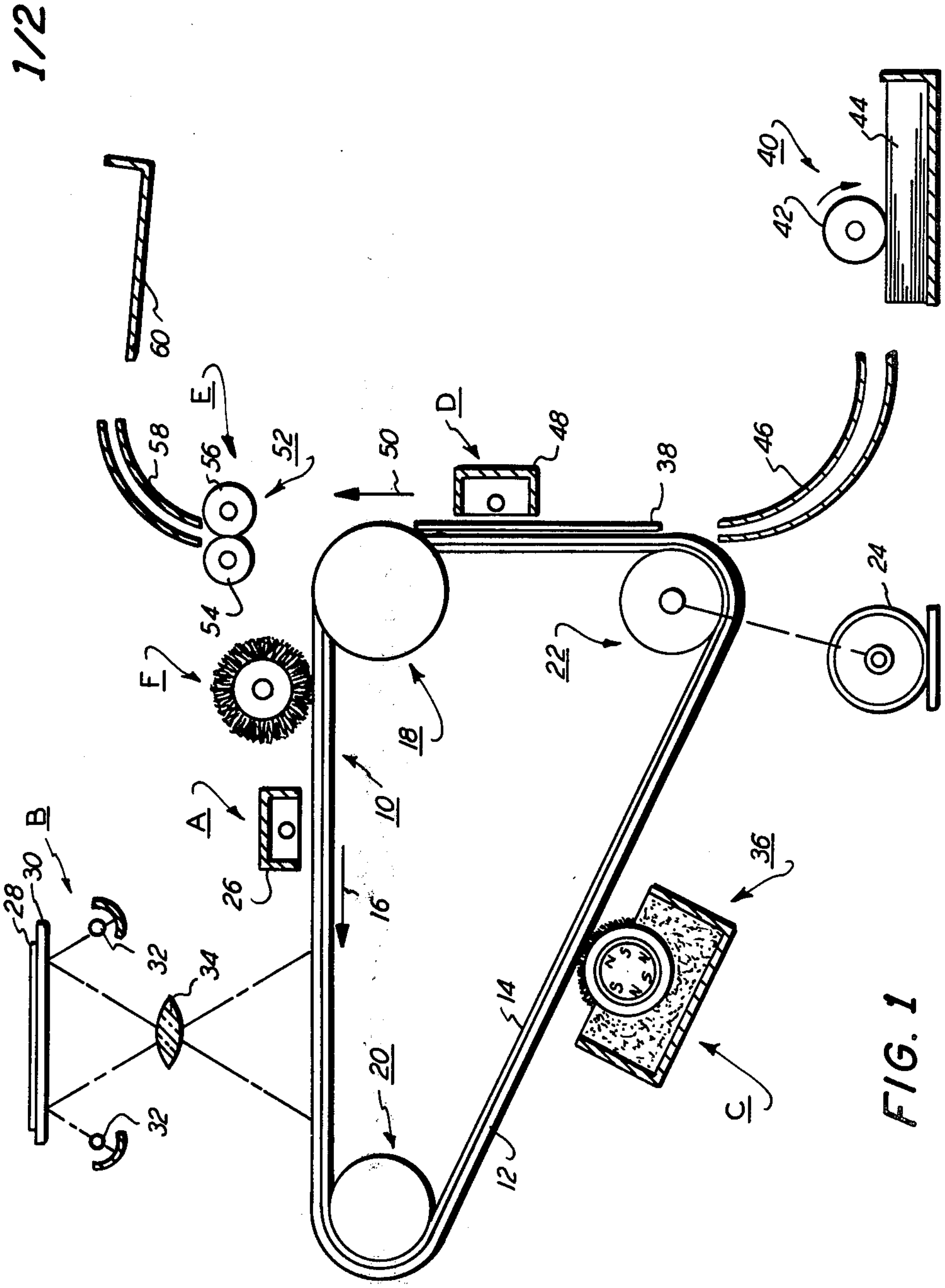
FIG. 1 is a schematic elevational view depicting an electrophotographic printing machine incorporating the features of the present invention therein.

For a general understanding of the features of the present invention, reference is made to the drawings. In the drawings, like reference numerals have been used throughout to designate identical elements. FIG. 1 schematically depicts the various components of an illustrative electrophotographic printing machine incorporating the belt support and steering mechanism of the present invention therein. Although the belt support and steering mechanism is particularly well adapted for use in an electrophotographic printing machine, it will become evident from the following discussion that it is equally well suited for use in a wide variety of devices and is not necessarily limited in its application to the particular embodiment shown herein.

Inasmuch as the art of electrophotographic printing is well known, the various processing stations employed in the FIG. 1 printing machine will be shown hereinafter schematically and their operation described briefly with reference thereto.

As shown in FIG. 1, the electrophotographic printing machine employs a belt 10 having a photoconductive surface 12 deposited on a conductive substrate 14. Preferably, photoconductive surface 12 is made from a selenium alloy with conductive substrate 14 being made from an aluminum alloy. Belt 10 moves in the direction of arrow 16 to advance successive portions of photoconductive surface 12 sequentially through the various processing stations disposed about the path of movement thereof. Belt 10 is entrained about tension roller 18, steering roller 20, and drive roller 22. Tension roller 18 is mounted resiliently on a pair of springs so as to be biased into engagement with belt 10. In this way, belt 10 is maintained under the desired tension. Steering roller 18 is mounted pivotably with a belt end sensor positioned on one side thereof. The belt end sensor is mounted translatably on steering roller 20. Steering roller 20 is adapted to pivot about an axis substantially normal to the belt wrap angle bisectrix. As belt 10 moves in the lateral direction, i.e. in a direction substantially normal to the direction indicated by arrow 16, it engages the belt end sensor causing translation thereof. The belt end sensor is coupled to the linkage which causes pivoting of the steering roller in response to translation thereof. As the steering roller pivots, it restores belt 10 to the pre-determined path of movement minimizing lateral deflection thereof. Thus, translation of the belt edge sensor causes tilting of the steering roller in a direction so as to provide an approach angle of belt 10 to drive roller 22, that corrects for the approach angle of belt 10 relative to the other rollers supporting belt 10. In this way, belt 10 is restored to the pre-determined path of movement. Drive roller 22 is in engagement with belt 10 and rotates to advance belt 10 in the direction of arrow 16. Roller 22 is rotated by motor 24 coupled thereto by suitable means, such as a drive belt.

With continued reference to FIG. 1, initially a portion of belt 10 passes through charging station A. At charging station A, a corona generating device, indicated generally by the reference numeral 26, charges photoconductive surface 12 to a relatively high, substantially uniform potential.

Thereafter, the charged portion of photoconductive surface 12 is advanced through exposure station B. At exposure station B, an original document 28 is positioned face-down on a transparent platen 30. Lamps 32 flash light rays onto the original document. The light rays reflected from the original document are transmitted through lens 34 forming a light image thereof. Lens 34 focuses the light image onto the charged portion of photoconductive surface 12. The charged photoconductive surface is discharged by the light image of the original document to record an electrostatic latent image on photoconductive surface 12. The latent image recorded on photoconductive surface 12 corresponds to the informational areas contained within original document 28.

Next, drum 10 advances the electrostatic latent image recorded on photoconductive surface 12 to development station C. At development station C, a magnetic brush development system, indicated generally by the reference numeral 36, advances a developer mix into contact with the electrostatic latent image recorded on photoconductive surface 12 of belt 10. Preferably, the developer mix comprises carrier granules having toner particles adhering triboelectrically thereto. The development system forms a brush having a chain-like array of developer mix extending outwardly therefrom. This mix contacts the electrostatic latent image recorded on photoconductive surface 12 of drum 10. The latent image attracts the toner particles from the carrier granules forming a toner powder image on photoconductive surface 12.

The toner powder image developed on photoconductive surface 12 of belt 10 is then transported to transfer station D. At transfer station D, a sheet of support material 38 is positioned in contact with the toner powder image deposited on photoconductive surface 12. The sheet of support material is advanced to the transfer station by a sheet feeding apparatus, indicated generally by the reference numeral 40. Preferably sheet feeding apparatus 40 includes a feed roll 42 contacting the uppermost sheet of the stack 44 of sheets of support material. Feed roll 42 rotates so as to advance the uppermost sheet from stack 44. The advancing sheet is moved from stack 44 into chute 46. Chute 46 directs the sheet of support material into contact with photoconductive surface 12 of belt 10 in a timed sequence so that the powder image developed thereon contacts the advancing sheet of support material at transfer station D. Transfer station D includes a corona generating device 48 which applies a spray of ions to the backside of sheet 38. This attracts the toner powder image from photoconductive surface 12 to sheet 38. After transfer, the sheet continues to move in the direction of arrow 50 and is separated from belt 10 by a detack corona generating device (not shown) neutralizing the charge causing sheet 38 to adhere to belt 10. A conveyor system (not shown) advances sheet 38 from belt 10 to fusing station E.

Fusing station E includes a fuser assembly, indicated generally by the reference numeral 52, which permanently affixes the transferred toner powder image to sheet 38. Preferably, fuser assembly 52 includes a heated fuser roller 54 and a back-up roller 56. Sheet 38 passes between fuser roller 54 and back-up roller 56 with the toner powder image contacting fuser roller 54. In this manner, the toner powder image is permanently affixed to sheet 38. After fusing, chute 58 guides the advancing sheet 38 to catch tray 60 for subsequent removal from the printing machine by the operator.

Invariably, after the sheet of support material is separated from photoconductive surface 12, some residual toner particles remain adhering thereto. These residual toner particles are cleaned from photoconductive surface 12 at cleaning station F. Preferably, cleaning station F includes a rotatably mounted fiberous brush 62 in contact with photoconductive surface 12 of belt 10. The particles are cleaned from photoconductive surface 12 by the rotation of brush 62 in contact therewith. Subsequent to cleaning, a discharge lamp (not shown) floods photoconductive surface 12 with light to dissipate any residual electrostatic charge remaining thereon prior to the charging thereof for the next successive imaging cycle.

It is believed that the foregoing description is sufficient for purposes of the present invention to illustrate the general operation of an electrophotographic printing machine incorporating the features of the present invention therein.

Figure 2:
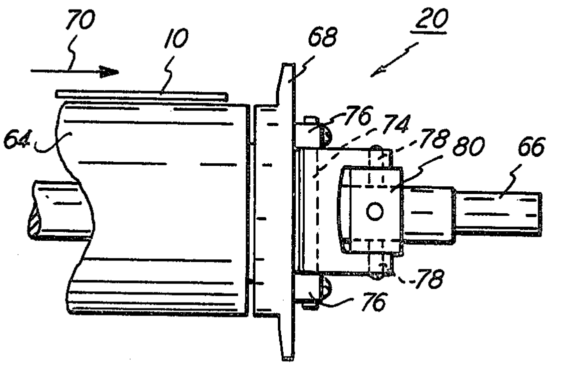
FIG. 2 is a fragmentary plan view showing the steering roller used in the FIG. 1 printing machine.

Turning now to the specific subject matter of the present invention, FIG. 2 depicts a partial elevational view of steering roller 20. As depicted thereat, steering roller 20 includes a tubular member 64 mounted on shaft 66. Shaft 66 is secured fixedly to the frame of the printing machine. Tubular member 64 is arranged to rotate about shaft 66 and tilt relative thereto. Tilting of tubular member 64 restores belt 10 to its pre-determined path of movement. Sensing member 68 is mounted translatably on tubular member 64. Preferably, sensing member 68 is a ring having a portion extending in a radially outwardly direction from the circumferential surface of tubular member 64 to contact the side edge of the laterally moving belt 10. As belt 10 moves laterally, in the direction of arrow 70, its side edge contacts sensor 68 causing translation thereof, in the direction of arrow 70. Bracket 72 is mounted pivotably on pin 74. Pin 74 is secured to end guide 68 by mounting block 76. The other end portion of bracket 72 is mounted pivotably on pins 78 which are secured fixedly to shaft 66 by mounting block 80. As sensor 68 moves in the direction of arrow 70, bracket 72 pivots in a clockwise direction. This produces a counterclockwise tilting of tubular member 64 relative to shaft 66 causing an approach angle change that causes belt 10 to move in a direction opposed to that of arrow 70. Thus, tilting of tubular member 64 causes belt 10 to return to the pre-determined path of travel thereof. Preferably, tubular member 64 is made from aluminum with shaft 66 being made from stainless steel. Alternatively, shaft 66 may be coated with rubber to increase the friction between belt 10 and shaft 66. This improves system response.

Figure 3:
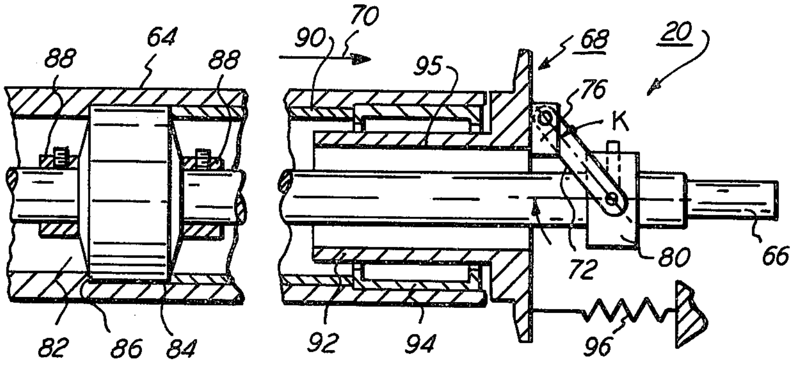
FIG. 3 is a fragmentary, sectional elevational view further illustrating the details of the FIG. 2 steering roller.

Referring now to FIG. 3, there is shown further details of steering roller 20. As depicted thereat, tubular member 64 is mounted rotatably and pivotably on shaft 66. Spherical ball bearing 82 is interposed between shaft 66 and tubular member 64. The outer race of spherical ball bearing 82 is mounted on interior surface 84 of tubular member 64. Seat 86 defines the axial location of the outer race of spherical ball bearing 82. The inner race of spherical ball bearing 82 is mounted on shaft 66 and held in position by collars 88. Tube 90 is mounted slidably on interior peripheral surface 84 of tubular member 64 and bears against the other side of the outer race of spherical ball bearing 82 to hold the outer race against seat 84. Spherical ball bearing 82 is axially positioned at the center of tubular member 64 which also corresponds substantially to the center of shaft 66. In this manner, tubular member 64 is free to rotate and tilt about shaft 66.

Sensor or ring 68 includes a tubular portion 92 mounted interiorly of tubular member 64 and spaced therefrom. Tubular portion 92 is also spaced from shaft 66. A needle bearing 94 is interposed between the interior peripheral surface 84 of tubular member 64 and tubular portion 92 of rings 68. Inasmuch as tubular portion 92 is spaced from shaft 66 by means of slot 95, tubular member 64 is free to pivot relative to shaft 66 without tubular portion 92 acting as a constraint thereon. Needle bearing 94 permits ring 68 to translate relative to tubular member 64. The outer race of needle bearing 94 is pressed onto inner peripheral surface 84 of tubular member 64. Interior tube 90 serves as a seat for axially locating the position of the outer race of needle bearing 94. As ring 68 translates on needle bearing 94 relative to tubular member 64 in the direction of arrow 70, bracket 72 pivots in the clockwise direction causing tubular member 64 to tilt about spherical ball bearing 82 in a counterclockwise direction returning belt 10 to the pre-determined path of travel. Sensor 68 is biased by spring 96 to tilt tubular member 64 so that belt 10 always moves in the direction of arrow 70. Spring 96 is selected to produce a minimum tilt of tubular member 64, i.e. merely sufficient to overcome the sliding friction between needle bearing 94 and ring 68. The spring force is sufficiently small to prevent damage to the edges of belt 10.

The angle K that the center line of bracket 72 makes with respect to the center line of shaft 66 determines the gain of the system, i.e. the coupling factor between the lateral misalignment of the belt and the steering angle correction which is introduced. Hence, if angle K were at 0°, the amount of steering axis rotation per unit of belt misalignment is infinite. Contrariwise, if angle K is 90°, the amount of steering axis rotation per unit of belt misalignment is zero. Under normal operating conditions, angle K is somewhat greater than 0° and less than 90°, i.e. it is an acute angle. Hence, the center line of bracket 72 extends in a transverse direction relative to the center line of shaft 66.

In recapitulation, it is evident that the apparatus of the present invention controls the lateral movement of the belt and provides a support therefor. A mechanical servo mechanism detects the belt lateral movement and automatically tilts the steering roller so as to return the belt to the desired path of movement. The servo mechanism includes a sensor arranged to translate relative to the belt support. As the sensor translates, it causes the belt support to tilt in a direction such that the belt is restored to the pre-determined path of movement eliminating any lateral deviations therefrom.

It is, therefore, evident that there has been provided in accordance with the present invention, an apparatus for supporting and controlling the lateral movement of the photoconductive belt such that the belt moves in a pre-determined path. This apparatus fully satisfies the aims and advantages hereinbefore set forth. While this invention has been described in conjunction with a specific embodiment thereof, it will be evident that many alternatives, modifications and variations will be apparent to those skilled in the art. Accordingly, it is intended to embrace all such alternatives modifications, and variations as fall within the spirit and broad scope of the appended claims.

What is claimed is:

1. An apparatus for controlling the lateral alignment of a belt arranged to move along a pre-determined path, including:

a tubular member arranged to support the portion of the belt passing thereover;

a substantially stationarily mounted shaft member disposed interiorly of and spaced from said tubular member;

means for rotatably and pivotably mounting said tubular member on said shaft member;

a ring extending in an outwardly direction from said tubular member and arranged to have a portion thereof positioned closely adjacent to the side edge of the belt so that lateral movement of the belt causes the side edge of the belt to contact said ring and translate said ring in the lateral direction;

means for translatably securing said ring on said tubular member; and a bracket having one end portion thereof attached pivotably to said ring with the other end portion thereof being attached pivotably to said shaft member so that the translation of said ring pivots said tubular member about an axis substantially normal to the longitudinal axis of said tubular member to return the belt to the pre-determined path.

2. An apparatus as recited in claim 1, wherein:

said mounting means includes a spherical ball bearing interposed between said shaft member and said tubular member to enable said tubular member to rotate and pivot relative to said shaft member; and said securing means includes a needle bearing interposed between said ring and said tubular member to enable said ring to translate relative to said tubular member in a direction substantially parallel to the longitudinal axis of said tubular member.

3. An apparatus as recited in claims 1 or 2, wherein said bracket extends in a transverse direction relative to the longitudinal axis of said shaft member.

4. An electrophotographic printing machine of the type having an endless photoconductive belt arranged to move in a predetermined path through a plurality of processing stations disposed therealong, wherein the improvement includes:

a tubular member arranged to have a portion of the photoconductive belt passing thereover;

a substantially stationarily mounted shaft member disposed interiorly of and spaced from said tubular member;

means for rotatably and pivotably mounting said tubular member on said shaft member;

a ring extending in an outwardly direction from said tubular member and arranged to have a portion thereof positioned closely adjacent to the side edge of the photoconductive belt so that lateral movement of the photoconductive belt causes the side edge of the photoconductive belt to contact said ring and translate said ring in the lateral direction;

means for translatably securing said ring on said tubular member; and a bracket having one end portion thereof attached pivotably to said ring with the other end portion thereof being attached pitovably to said shaft member so that translation of said ring pivots said tubular member about an axis substantially normal to the longitudinal axis of said tubular member to return the photoconductive belt to the predetermined path.

5. A printing machine as recited in claim 4, wherein:

said mounting means includes a spherical ball bearing interposed between said shaft member and said tubular member to enable said tubular member to rotate and pivot relative to said shaft member; and said securing means includes a needle bearing interposed between said ring and said tubular member to enable said ring to translate relative to said tubular member in a direction substantially parallel to the longitudinal axis of said tubular member.

6. A printing machine as recited in claims 4 or 5, wherein said bracket extends in a transverse direction relative to the longitudinal axis of said shaft member.

* * * * *